(12) United States Patent
Pakulski

(10) Patent No.: US 7,618,926 B1
(45) Date of Patent: Nov. 17, 2009

(54) METHOD OF FOAMING SATURATED OR NEAR SATURATED BRINES WITH SYNERGISTIC MIXTURES

(75) Inventor: Marek K. Pakulski, The Woodlands, TX (US)

(73) Assignee: BJ Services Company, Houston, TX (US)

(*) Notice: Subject to any disclaimer, the term of this patent is extended or adjusted under 35 U.S.C. 154(b) by 646 days.

(21) Appl. No.: 11/360,645

(22) Filed: Feb. 23, 2006

Related U.S. Application Data

(63) Continuation-in-part of application No. 10/326,195, filed on Dec. 20, 2002, now abandoned.

(51) Int. Cl.
  *C09K 8/594* (2006.01)
(52) U.S. Cl. ........................ 507/241; 507/202; 507/239; 507/240; 507/244; 507/247; 507/254; 507/255; 507/256; 507/259; 507/272; 507/276; 166/309
(58) Field of Classification Search ........................ None
  See application file for complete search history.

(56) References Cited

U.S. PATENT DOCUMENTS

| | | | |
|---|---|---|---|
| 3,172,474 A | 3/1965 | Siegele | |
| 4,080,310 A | 3/1978 | Ng | |
| 4,186,803 A * | 2/1980 | Mondshine | 166/292 |
| 4,375,422 A | 3/1983 | Blackstone | |
| 4,416,792 A | 11/1983 | Blackstone | |
| 4,421,168 A * | 12/1983 | Hurd | 166/270.1 |
| 4,544,494 A | 10/1985 | Downey | |
| 4,703,797 A * | 11/1987 | Djabbarah | 166/252.1 |
| 4,796,702 A * | 1/1989 | Scherubel | 166/308.6 |
| 5,110,503 A | 5/1992 | Cohen | |
| 5,203,411 A * | 4/1993 | Dawe et al. | 166/270.1 |
| 5,385,206 A | 1/1995 | Thomas | |
| 5,385,695 A | 1/1995 | Cohen | |
| 5,591,701 A | 1/1997 | Thomas | |
| 5,597,513 A | 1/1997 | Cohen | |
| 5,620,947 A * | 4/1997 | Elward-Berry | 507/229 |
| 5,654,260 A * | 8/1997 | Wu | 507/264 |
| 5,994,281 A | 11/1999 | He | |
| 6,210,476 B1 * | 4/2001 | Chatterji et al. | 106/677 |
| 6,268,314 B1 * | 7/2001 | Hughes et al. | 507/202 |
| 6,302,209 B1 * | 10/2001 | Thompson et al. | 166/305.1 |
| 6,715,553 B2 * | 4/2004 | Reddy et al. | 166/309 |

* cited by examiner

*Primary Examiner*—James Seidleck
*Assistant Examiner*—John J Figueroa
(74) *Attorney, Agent, or Firm*—Jones & Smith, LLP; John Wilson Jones

(57) ABSTRACT

A synergistic blend for foaming concentrated brines comprises at least one foaming agent (in an amount between from about 10 to about 90 weight percent of the blend) and a compound of the formula:

$$C_nH_{2n+1}-N-[(CH_2)_mCOOM]_2 \qquad (I)$$

wherein n is 4 to 11, M is an alkali metal and m is 1 to 3. Especially suitable as foaming agent are quaternary ammonium salts, alkyl betaines, alkylamidopropyl betaines, sulfabetaines, hydroxysultaines, amphoteric perfluorohydrocarbons, as well as alkylether sulfates. Such synergistic blends are especially useful in the foaming of saturated or near saturated brines.

20 Claims, No Drawings

METHOD OF FOAMING SATURATED OR NEAR SATURATED BRINES WITH SYNERGISTIC MIXTURES

This application is a continuation-in-part application of U.S. patent application Ser. No. 10/326,195, filed on Dec. 20, 2002.

FIELD OF THE INVENTION

The invention relates to synergistic mixtures of (i.) an amino acid derivative of the formula $C_nH_{2n+1}-N-[(CH_2)_m COO\ M]_2$ wherein n is 4 to 11, M is an alkali metal and m is 1 to 3; and (ii.) a surfactant capable of foaming concentrated brine and method of using the synergistic mixture to foam brines.

BACKGROUND OF THE INVENTION

Concentrated brines are frequently found within oil and gas wells and have applications in many industries including use in refrigeration, ship ballasting and mining operations. In the oil industry, heavy sodium chloride brines are often encountered within production zones.

Some types of brines may be introduced into a wellbore as part of the completion process. Common completion brines include NaBr, $CaCl_2$, $CaBr_2$, $ZnBr_2$, HCOONa, HCOOK, HCOOCS. The density of synthetic brines may be as low as water or as high as 2.4 g/mL. Synthetic brines are mainly applied after the drilling and before the acidizing or fracturing of the well, which includes, displacement, running completion tools, packers, production tubing, etc. The purpose of the brine completion fluid is mainly to provide hydrostatic pressure to control the wells during displacement, completion or production operations. Concentrated synthetic brines, unlike drilling fluids, are free of suspended solids. Thus, in those cases where they enter oil or gas bearing formations, no damage (i.e. plugging) of the production zone occurs.

The densities of several saturated salt solutions are listed below in Table I:

TABLE I

| Compound | Density | Concentration |
|---|---|---|
| NaCl | 1.2 | 26% |
| NaBr | 1.41 | 40% |
| HCOONa | 1.32 | 44.7% |
| KCl | 1.16 | 24% |
| KBr | 1.37 | 40% |
| CsCl | 1.88 | 64% |
| $CaCl_2$ | 1.4 | 40% |
| $CaBr_2$ | 1.83 | 57% |
| $ZnBr_2$ | 2.30 | 52.5% |

When a wellbore is filled with such high-density fluids, the hydrostatic pressure is balanced by the formation pressure. Once the work is completed, it is necessary for the fluid to return to the surface of the well. A common well dewatering method consists of the addition of a foaming agent to the fluid inside the well. Gas is then used to convert the liquid into low-density foam. The foam, which produces only a fraction of the hydrostatic pressure of the liquid, flows out of the well with less pressure required than that for the non-foamed brine. In a similar fashion, if a well is producing brine, it can be removed from the well with foaming agent assistance, thereby preventing the phenomena of "drowning" the well. ("Drowning" refers to the filling of the well with water such that the well becomes "drowned", thereby prohibiting the production of gas.)

Unfortunately, most foaming surfactants do not exhibit foaming abilities in concentrated brines. In many instances, surfactants will be salted out of solutions and precipitate. Even commercial products advertised as "brine foamers" fail in saturated and nearly saturated salt solutions. A foamer for use with concentrated brines is therefore needed.

SUMMARY OF THE INVENTION

The invention relates to a synergistic blend for foaming concentrated brines. The blend comprises at least one foaming agent and a compound of the formula:

$$C_nH_{2n+1}-N-[(CH_2)_mCOOM]_2 \quad (I)$$

wherein n is 4 to 11, M is an alkali metal and m is 1 to 3. The foaming agent, used in conjunction with the carboxyalkyl amine of formula (I) may be any foaming agent conventionally used in the art in the treatment of brine, including a quaternary ammonium salt, an alkyl betaine, an alkylamidopropyl betaine, a sulfobetaine, a hydroxysultaine, an amphoteric perfluoroalkylamido sulfonate or an alkylether sulfate. Such synergistic blends are especially useful in the foaming of saturated or near saturated brine.

The amount of foaming agent in the blend is between from about 10 to about 90 weight percent of the total blend.

Most preferred is the disodium N-(2-carboxyethyl)-N-octylbetaalanine represented by the formula (II):

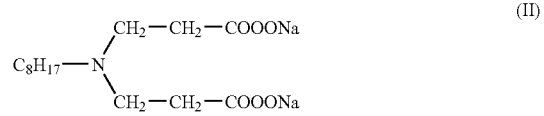

which is commercially available under trade names DeTeric ODP-LF (DeForest Enterprise) or Mackam ODP (McIntyre Group, Ltd.).

The synergistic blend produces stable foams in such difficult to foam brine fluids as those set forth in Table I.

DETAILED DESCRIPTION OF PREFERRED EMBODIMENTS

Stable foams of diverse brines including such difficult to foam brines, like saturated calcium chloride and sodium chloride solutions, are stabilized by the addition of a blend comprising at least two compounds. One such component is an amino acid derivative of the formula:

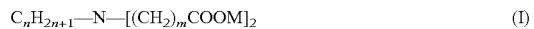

$$C_nH_{2n+1}-N-[(CH_2)_mCOOM]_2 \quad (I)$$

wherein n is 4 to 11, preferably 7 or 8, M is an alkali metal and m is 1 to 3. The other component is a conventional foaming agent for brine.

The blend can be added to any brine, most preferably the brines set forth in Table I above. The amount of blend typically added to the brine to generate the stable foam brine is from about 0.1 to about 2, preferably from about 0.01 to about 0.5, weight percent of the brine.

In a preferred mode, the carboxyalkyl amine of formula (I) is one wherein n is 7 to 8 and m is 2. In a most preferred mode, the alkali metal is either sodium or potassium. Exemplary of such species is disodium octyliminodipropionate. The amount of the carboxyalkyl amine in the blend is from about 10 to about 90 weight percent of the blend.

In a preferred mode, the blend is used to foam saturated or near saturated brine. A near saturated brine is one which is in excess of 70, typically in excess of 75, more typically in excess of 80, percent of its maximum saturated level. Table II below lists the salt concentrations of brines at saturated and 70 percent saturation:

TABLE II

| Compound | Salt concentration @100% sat. brine | Salt concentration @70% sat. brine |
|---|---|---|
| NaCl | 26% | 18.2% |
| NaBr | 40% | 28% |
| HCOONa | 44.7% | 31.29% |
| KCl | 24% | 16.8% |
| KBr | 40% | 28% |
| CsCl | 64% | 44.8% |
| CaCl$_2$ | 40% | 28% |
| CaBr$_2$ | 57% | 39.9% |
| ZnBr$_2$ | 52.5% | 36.75% |

The conventional foaming agent includes cationic, anionic and non-ionic foaming agents. Preferred are quaternary ammonium salts, alkyl betaines, alkylamidopropyl betaines, sulfobetaines, hydroxysultaines, amphoteric perfluoroalkylamido sulfonate, and alkylether sulfates.

Exemplary of the quaternary ammonium salts are those of the formula [N$^+$R$^1$R$^2$R$^3$R$^4$][X$^-$] wherein R$^1$, R$^2$, R$^3$ and R$^4$ contain one to 18 carbon atoms, X is Cl, Br or I and may optionally be substituted with or derived from natural fats or oils, such as coconut oil, tallow oil, etc. For instance, trimethyl hexadecylammonium chloride when substituted with a coconut oil derivative may become cocotrimethyl ammonium chloride, which is as equally effective as trimethyl hexadecylammonium chloride.

Exemplary of amphoteric perfluoroalkylamido sulfonates are of general formula C$_n$F$_{2n+1}$—SO$_2$NC$_m$H$_{2m}$N$^+$RR(C$_m$H$_{2m}$)SO$_3^-$ wherein n is 2 to 16, m is 1 to 4 and R is methyl or ethyl.

Exemplary of the sulfobetaines are of the formula:

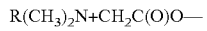

R(CH$_3$)$_2$N+CH$_2$C(O)O— wherein R represents an alkyl or alkenyl radical containing 6 to 24 carbon atoms. Representative alkyl betaines include lauryl betaine.

Examples of sultaines and hydroxysultaines include materials such as cocamidopropyl hydroxysultaine Exemplary of the sulfabetaines are of the formula:

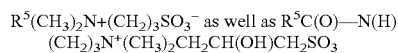

R$^5$(CH$_3$)$_2$N+(CH$_2$)$_3$SO$_3^-$ as well as R$^5$C(O)—N(H)(CH$_2$)$_3$N$^+$(CH$_3$)$_2$CH$_2$CH(OH)CH$_2$SO$_3$ wherein R$^5$ represents an alkyl or alkenyl radical containing 6 to 24 carbon atoms.

Exemplary alkylamidopropylbetaines are of the formula:

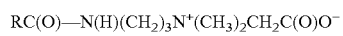

RC(O)—N(H)(CH$_2$)$_3$N$^+$(CH$_3$)$_2$CH$_2$C(O)O$^-$ wherein R is the same as above.

Suitable amidoalkylbetaines include cocamidopropylbetaine.

Exemplary of alkylether sulfates are of the formula:

C$_n$H$_{2n+1}$(OC$_m$H$_{2m}$)$_k$SO$_4^-$M$^+$ wherein n is 4 to 18, m is 2 to 3, k is 1 to 6 and M is Na, K or NH$_4$ In addition, mixture of any two or more conventional foaming agents may be employed. The most effective compositions are those containing:

between from about 10 to about 70% of disodium octyliminodipropionate between from about 7 to about 40% of cocoamidopropyl betaine between from about 10 to about 60% of cocotrimethyl ammonium chloride as well as those containing:

between from about 20 to about 40% of disodium octyliminodipropionate between from about 15 to about 35% of cocoamidopropyl betaine between from about 20 to about 30% of cocotrimethyl ammonium chloride.

The combination of octyliminodipropionate and alkylamidopropyl betaine is often preferred over quaternary foaming agents because of lower costs. Alkylamidopropyl betaines are relatively inexpensive.

EXAMPLES

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow. All parts are given in terms of weight units except as otherwise indicated.

Examples 1-22

100 ml of brine was placed in a Waring 1 L Blender and 0.4 ml of foaming agent was added. The blender was covered and the mixture blended at high speed for 20 seconds. The content of the blender was then poured instantly into a 500 ml graduated cylinder and a stopwatch was started. The foam volume (V) and foam half-life time (T ½) was measured. Foam half-life time is recorded when 50 ml of liquid drains to the bottom of the cylinder. The foam quality, Q, was calculated as follows:

$$Q = \frac{V - 100}{V} \times 100\%$$

The higher foam volume, V, and foam half-life time, T ½ values indicate higher quality and more stable foam.

Nine foaming surfactants were selected for this work, as set forth in Table III below:

TABLE III

| Symbol | Chemical Name | Trade Name | Source |
|---|---|---|---|
| A | C14-16 Alpha olefine sulfonate | Witconate AOS | Crompton |
| B | C12 Alpha olefine sulfonate | Witconate AOS-12 | Crompton |
| C | Alkyl ether sulfate | Witcolate 1247H | Crompton |
| D | Alkylamidopropylhydroxy-sulfobetaine | Mafo CSB-50 | PPG |

TABLE III-continued

| Symbol | Chemical Name | Trade Name | Source |
|---|---|---|---|
| E | Amphoteric perfluorosurfactant | Fluorad FC-751 | 3M |
| F | Dodecyliminodipropionate | Monateric 1188 | Mona |
| G | Alkyltrimethyl ammonium chloride | Arquad C-50 | Akzo-Nobel |
| H | Cocamidopropyl betaine | Generic | Generic |
| I | Octyliminodipropionate | DeTeric ODP-LF | DeForest |

The results for the experiments in saturated (26%) NaCl solutions are reported in Table IV.

TABLE IV

| Ex. No. | Foamer Comp, g | Foam V, ml | Foam T ½ min |
|---|---|---|---|
| 1 | A, 0.5 | 100 | 0 |
| 2 | B, 0.5 | 135 | 0:30 |
| 3 | C, 0.5 | 305 | 1:17 |
| 4 | D, 0.5 | 225 | 2:18 |
| 5 | E, 0.25 | 230 | 1:50 |
| 6 | F, 0.4 | 180 | 1:35 |
| 7 | G, 0.4 | 205 | 3:59 |
| 8 | H, 0.4 | 205 | 1:37 |
| 9 | I, 0.4 | 140 | 0:08 |
| 10 | F, 0.3 + H, 0.2 | 180 | 0:32 |
| 11 | F, 0.3 + G, 0.2 | 255 | 3:11 |
| 12 | G, 0.2 + I, 0.2 | 300 | 4:20 |
| 13 | G, 0.2 + H, 0.2 | 305 | 4:35 |
| 14 | H, 0.2 + I, 0-2 | 275 | 4:38 |
| 15 | F, 0.1 + G, 0.1 + H, 0.2 | 240 | 2:50 |
| 16 | G, 0.05 + H, 0.3 + I, 0.05 | 300 | 4:12 |
| 17 | G, 0.1 + H, 0.2 + I 0.1 | 325 | 4:59 |
| 18 | G, 0.06 + H, 0.12 + I, 0.22 | 315 | 5:04 |
| 19 | G, 0.18 + H, 0.16 + I, 0.06 | 325 | 5:04 |
| 20 | G, 0.12 + H, 0.2 + I, 0.08 | 330 | 5:05 |
| 21 | G, 0.1 + H, 0.16 + I, 0.14 | 325 | 5:20 |
| 22 | G, 0.08 + H, 0.08 + I, 0.24 | 345 | 5:16 |

The results tabulated in Table IV prove the foaming ability of a single foaming agent (Exp. 1-9), enhanced foaming for two component mixtures (Exp. 10-14) and superior foaming ability of three component mixture of surfactants G, H and I. (Exp. 15-22). Note that dodecyliminodipropionate, F, Examples 6, 10, 11 and 15 showed decent foaming ability by itself; however, it did not display any foaming synergy like octyl analog, I, octyliminodipropionate. The mixture of foamers G, H, I demonstrated excellent ability to produce stable foams of saturated NaCl solution.

The most effective compositions are those containing:
between from about 10 to about 70% of disodium octyliminodipropionate
between from about 7 to about 40% of cocoamidopropyl betaine
between from about 10 to about 60% of cocotrimethyl ammonium chloride
as well as those containing:
between from about 20 to about 40% of disodium octyliminodipropionate
between from about 15 to about 35% of cocoamidopropyl betaine
between from about 20 to about 30% of cocotrimethyl ammonium chloride Examples 23-34

The same testing procedure set forth above for Examples 1-22 was applied to test foaming agents and mixtures in the foaming of saturated $CaCl_2$ brine solutions, see Table V:

TABLE V

| Exp. # | Foamer Comp, g | Foam V, ml | Foam T ½ min |
|---|---|---|---|
| 23 | F, 0.4 g | 130 | 0:15 |
| 24 | G, 0.4 g | 210 | 4:10 |
| 25 | H, 0.4 g | 160 | 1:33 |
| 26 | I, 0.4 g | 120 | 0:15 |
| 27 | G, 0.2 + H, 0.2 g | 190 | 3:58 |
| 28 | G, 0.2 + I, 0.2 | 190 | 3:35 |
| 29 | H, 0.2 + I, 0.2 | 170 | 2:45 |
| 30 | F, 0.1 + G, 0.1 + H, 0.2 | 185 | 2:06 |
| 31 | G, 0.1 + H, 0.2 + I, 0.1 | 190 | 3:22 |
| 32 | G, 0.1 + H, 0.16 + I, 0.14 | 190 | 4:00 |
| 33 | G, 0.08 + H, 0.08 + I, 0.24 | 190 | 4:05 |
| 34 | G, 0.06 + H, 0.24 + I, 0.1 | 250 | 3:50 |

The experiments performed in $CaCl_2$ brine produced similar results to those in $NaCl_2$ solutions. The three component mixture containing G, H, and I (Examples. 31-34) performed better than a single foaming agent or a mixture of two. A preferred concentration of octyliminodipropionate to effectively boost the foamers' performance is between from about 20% to about 60%.

The same foam experiments were performed in saturated NaBr and $CaBr_2$ solutions. The results effectively mirror the data above.

Examples 35-50

Examples 7, 8, 9 and 22 were repeated but using different concentrations of sodium chloride brine. Table VI tabulates the foam volume and foam half-life time for the single foaming agent as well as synergistic blends defined by the invention.

TABLE VI

| Ex. | Foamer Comp, g | NaCl Brine, % Saturation | Foam V, ml | Foam T ½. Min |
|---|---|---|---|---|
| 35 | I, 0.4 | 25 (6.5% NaCl solution) | 125 | 0:08 |
| 36 | H, 0.4 | 25 (6.5% NaCl solution) | 275 | 1:56 |
| 37 | G, 0.4 | 25 (6.5% NaCl solution) | 360 | 2:30 |
| 38 | G, 0.08 + H, 0.08 + I, 0.24 | 25 (6.5% NaCl solution) | 360 | 3:01 |
| 39 | I, 0.4 | 50 (13% NaCl solution) | 120 | 0:05 |
| 40 | H, 0.4 | 50 (13% NaCl solution) | 270 | 2:00 |
| 41 | G, 0.4 | 50 (13% NaCl solution) | 350 | 3:40 |
| 42 | G, 0.08 + H, 0.08 + I, 0.24 | 50 (13% NaCl solution) | 350 | 3:39 |
| 43 | I, 0.4 | 70 (18.2% NaCl solution) | 110 | 0:05 |
| 44 | H, 0.4 | 70 (18.2% NaCl solution) | 250 | 1:48 |
| 45 | G, 0.4 | 70 (18.2% NaCl solution) | 330 | 3:54 |
| 46 | G, 0.08 + H, 0.08 + I, 0.24 | 70 (18.2% NaCl solution) | 370 | 4:29 |
| 47 | I, 0.4 | 90 (23.4% NaCl solution) | 120 | 0:08 |
| 48 | H, 0.4 | 90 (23.4% NaCl solution) | 255 | 1:40 |
| 49 | G, 0.4 | 90 (23.4% NaCl solution) | 200 | 3:49 |
| 50 | G, 0.08 + H, 0.08 + I, 0.24 | 90 (23.4% NaCl solution) | 360 | 4:52 |
| 9 | I, 0.4 | 100 (26% NaCl solution) | 140 | 0:08 |
| 8 | H, 0.4 | 100 (26% NaCl solution) | 205 | 1:37 |
| 7 | G, 0.4 | 100 (26% NaCl solution) | 205 | 3:59 |
| 22 | G, 0.08 + H, 0.08 + I, 0.24 | 100 (26% NaCl solution) | 345 | 5:16 |

The data illustrates that at lower brine concentrations the same high and stable foam can be produced with a G+H+I foaming surfactant mixture as with a single component foaming agent. In other words, the G foamer produced similar foams up to 50% saturation NaCl brine. At brine saturation 70% and above, the blend demonstrated superiority of foaming properties over the best performing single component, foamer G.

From the foregoing, it will be observed that numerous variations and modifications may be effected without departing from the true spirit and scope of the novel concepts of the invention.

What is claimed is:

1. A method of foaming a brine which is at least 70 percent saturated, which comprises introducing to the brine a blend comprising:
   (i.) at least one foaming agent; and
   (ii.) a compound of the formula:

$$C_nH_{2n+1}-N-[(CH_2)_mCOOM]_2$$

wherein n is 4 to 11, M is an alkali metal and m is 1 to 3; and
further wherein the foaming agent of (i.) is different from the compound of (ii.).

2. The method of claim 1, wherein n is 7 to 8.
3. The method of claim 2, wherein m is 2.
4. The method of claim 1, wherein the foaming agent is a quaternary ammonium salt, an alkyl betaine, an alkylamidopropyl betaine, a sulfobetaine, a hydroxysultaine, an amphoteric perfluoroalkylamido sulfonate or an alkylether sulfate.
5. The method of claim 4, wherein the foaming agent is a mixture of at least two of the following: dodecyliminodipropionate, amphoteric perfluoroalkylamido sulfonate, alkyltrimethyl ammonium chloride, alkylamidopropyl betaine and octyliminodipropionate.
6. The method of claim 1, wherein the compound of formula (II) is $$C_8H_{17}-N-[(CH_2)_2COOM]_2$$

wherein M is sodium or potassium.

7. The method of claim 1, wherein the amount of foaming agent of (i.) in the blend is between from about 10 to about 90 weight percent of the total blend.
8. A method of foaming a brine which is at least 70 percent saturated which comprises introducing to the brine a blend comprising:
   (i.) at least one foaming agent; and
   (ii.) a compound of the formula:

$$C_nH_{2n+1}-N-[(CH_2)_mCOOM]_2$$

wherein n is 4 to 11, M is an alkali metal and m is 1 to 3, and
   further wherein the amount of at least one foaming agent in the blend is between from about 10 to about 90 weight percent of the blend and the foaming agent of (i.) is different from the compound of (ii.).
9. The method of claim 8, wherein n is 7 to 8.
10. The method of claim 8, wherein m is 2 and M is sodium or potassium.
11. The method of claim 8, wherein the foaming agent is a quaternary ammonium salt, an alkyl betaine, an alkylamidopropyl betaine, a sulfobetaine, a hydroxysultaine, an amphoteric perfluoroalkylamido sulfonate or an alkylether sulfate.
12. The method of claim 8, wherein the foaming agent comprises:
    between from about 10 to about 70% of disodium octyliminodipropionate;
    between from about 7 to about 40% of cocoamidopropyl betaine; and
    between from about 10 to about 60% of cocotrimethyl ammonium chloride.
13. The method of claim 12, wherein the foaming agent comprises:
    between from about 20 to about 40% of disodium octyliminodipropionate;
    between from about 15 to about 35% of cocoamidopropyl betaine; and
    between from about 20 to about 30% of cocotrimethyl ammonium chloride.
14. A method of foaming saturated or near saturated a brine which is at least 70 percent saturated which comprises introducing to the brine a blend comprising:
    (i.) at least one foaming agent; and
    (ii.) a compound of the formula:

$$C_nH_{2n+1}-N-[(CH_2)_mCOOM]_2$$

wherein n is 4 to 11, M is an alkali metal and m is 1 to 3, and further wherein the amount of at least one foaming agent in the blend is between from about 10 to about 90 weight percent of the blend and wherein the brine is selected from the group consisting of NaCl, NaBr, HCOONa, KCl, KBr, CsCl, CaCl$_2$, CaBr$_2$ and ZnBr$_2$ brines; the foaming agent of (i.) being different from the compound of (ii.).
15. The method of claim 14, wherein n is 7 to 8.
16. The method of claim 14, wherein m is 2 and M is sodium or potassium.
17. The method of claim 15, wherein the foaming agent is a quaternary ammonium salt, an alkyl betaine, an alkylamidopropyl betaine, a sulfabetaine, a sultaine, a hydroxysultaine, an amphoteric perfluoroalkylamido sulfonate or an alkylether sulfate.
18. The method of claim 15, wherein the brine is calcium chloride brine.
19. The method of claim 15, wherein the brine is sodium chloride brine.
20. The method of claim 15, wherein the compound of formula (II.) is disodium octyliminodipropionate.

* * * * *

UNITED STATES PATENT AND TRADEMARK OFFICE
CERTIFICATE OF CORRECTION

PATENT NO. : 7,618,926 B1 Page 1 of 1
APPLICATION NO. : 11/360645
DATED : November 17, 2009
INVENTOR(S) : Pakulski It is certified that error appears in the above-identified patent and that said Letters Patent is hereby corrected as shown below:

Column 8, line 24, delete "saturated or near saturated."

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.      : 7,618,926 B1
APPLICATION NO. : 11/360645
DATED           : November 17, 2009
INVENTOR(S)     : Marek K. Pakulski Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Twenty-sixth Day of October, 2010

David J. Kappos
*Director of the United States Patent and Trademark Office*